US005713408A

United States Patent [19]

Morando

[11] Patent Number: 5,713,408

[45] Date of Patent: Feb. 3, 1998

[54] METHOD FOR MAKING A MULTICAST ROLL

[75] Inventor: Jorge A. Morando, Grosse Ile, Mich.

[73] Assignee: Alphatech, Inc., Trenton, Mich.

[21] Appl. No.: 526,542

[22] Filed: Sep. 5, 1995

Related U.S. Application Data

[63] Continuation-in-part of Ser. No. 287,647, Aug. 9, 1994, abandoned, and Ser. No. 383,578, Feb. 3, 1995.

[51] Int. Cl.[6] .................... B23P 15/00

[52] U.S. Cl. .................... 164/96; 164/135; 29/895.72; 492/54

[58] Field of Search .................... 164/94, 95, 96, 164/98, 135; 29/895.22; 492/54

[56] References Cited

U.S. PATENT DOCUMENTS

| | | | |
|---|---|---|---|
| 1,374,750 | 4/1921 | McWare | 164/135 |
| 1,958,109 | 5/1934 | Morris | 164/96 |
| 2,483,849 | 10/1949 | Seaman | 164/96 |
| 4,211,269 | 7/1980 | Bentz et al. | 164/94 |
| 4,377,196 | 3/1983 | Khandros | 164/96 |
| 5,295,528 | 3/1994 | Diyecha et al. | 164/98 |

*Primary Examiner*—Irene Cuda
*Attorney, Agent, or Firm*—Charles W. Chandler

[57] ABSTRACT

A method for centrifugally casting a multi-alloy low adhesion furnace roll, includes separately casting each layer and then solidifying the layers when all layers have been cast.

10 Claims, 4 Drawing Sheets

METHOD FOR MAKING A MULTICAST ROLL

CROSS-REFERENCE TO RELATED APPLICATIONS

This application is a continuation-in-part of application Ser. No. 08/287,647, filed Aug. 9, 1994, now abandoned, for "Heat Treating, Annealing and Tunnel Furnace Rolls"; and "Composite Centrifugally Cast Furnace Roll Rings for Furnace Rolls and Method for Making Same", Ser. No. 08/383,578, filed Feb. 3, 1995.

BACKGROUND OF THE INVENTION

This invention is related to a multi-cast furnace roll having an outer layer centrifugally cast of a material that is relatively insoluble with respect to the steel strip being transferred in a furnace, and an inner layer or body of a steel alloy that has high tensile and creep strength and is relatively unweldable to the outer layer. The outer layer and the inner layer are centrifugally cast to fuse the two layers together.

In my aforementioned co-pending application, I disclosed a centrifugally cast furnace roll, and rings that can be used on such rolls, having an outer layer selected of a material having a low solubility, high hardness, and low surface energy so the roll does not adhere to a steel strip being transferred in the furnace. I also disclosed a method for centrifugally casting an inner layer to the inside of the outer layer while it is still in a molten state.

The outer layer was formed by introducing the outer layer alloy into a rotating mold and then advancing the source of the first alloy from one end of the mold toward the other end to form an elongated tube.

The inner layer was then formed by introducing the molten second alloy material within the outer layer in the same starting position as the first alloy material was introduced, and then longitudinally advancing the source of the material in the same direction as the first alloy was delivered to the mold.

While such a method provides a satisfactory roll, the length of the roll is limited because the outer layer gradually cools before the inner layer is cast. The two layers form a satisfactory interface at those points where the difference in temperature does not exceed approximately 200° F., depending on the alloys temperature at the casting moment. When the downstream ends of the two layers begins to exceed 200° F., the two layers separate as they cool. The two layers do not form a satisfactory solution at their interface if the difference in temperature exceeds approximately 200° F.

SUMMARY OF THE INVENTION

The broad purpose of the present invention is to provide an improved casting technique for forming a multi-cast roll. One improvement is that rather than using a spout that advances longitudinally along the inner length of the mold, the molten metal is introduced through a nozzle at one end of the mold, which we will refer to as the hot end. The metal then spirals longitudinally along the length of the mold as the mold is being rotated about its longitudinal axis, forming an outer layer of a uniform thickness. The mold could be slightly inclined to accelerate the metal distribution.

Rather than introducing both alloys into the same end of the mold, the second alloy is then introduced into the opposite end of the mold, that is into the down stream end of the first alloy, thus reducing the temperature difference between the alloy layers at both ends of the mold. The second alloy then spirals along the inside surface of the outer layer at a temperature such that the two layers form an interface of a solution of the two alloys thereby fusing the inner layer to the outer layer.

In another embodiment of the invention, the outer layer alloy is introduced simultaneously into both ends of the mold. The two metals spiral toward one another, forming a continuous outer layer when they meet in the center of the mold.

Then, the second alloy is introduced through both ends of the mold inside the outer layer to form the inner layer.

One advantage of introducing the two alloys from both ends of the mold is that the roll is casted at a higher speed. A satisfactory roll can be formed that is twice the length of a roll formed by introducing both alloys into the same end of the mold.

Another purpose is to provide a variation to the ring roll design fabrication.

In some instances when the particular application requires a large number of rings (for example, when the strip being carried is very thin or when the roll is very long) it may be more economical, than welding the multi-cast rings, to cast a multi-cast roll then machining off a portion of the outer layer to the solution zone or interface to generate the rings. This procedure eliminates the need for:

a) casting a separate roll body;

b) machining the inside diameter of the ring and the outside diameter of the roll body to match;

c) welding the rings to the roll body;

d) for a given ring outside diameter, the roll body outside diameter can be made larger, thus increasing the section modulus and consequently reducing the amount of casted material required to overcome the bending stresses.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
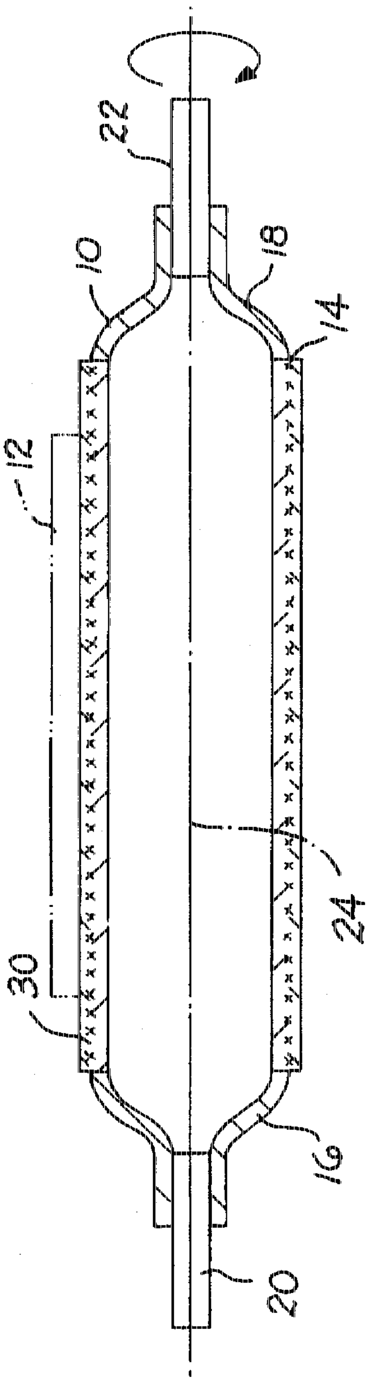
FIG. 1 illustrates the cross-section of a preferred multi-casted furnace roll for transferring a strip of steel in an annealing furnace.

FIG. 1 illustrates the cross-section of a ringless roll 10, made in accordance with the invention and used for transferring an alloy steel alloy strip 12 having a cross-section illustrated in phantom. The strip may be formed of a stainless steel (300 or 400 series) alloy. Roll 10 has a multi-cast tubular body 14 connected by a pair of bell shaped end sections 16 and 18 to a pair of end shafts 20 and 22, respectively. The end shafts are axially aligned and adapted to support the roll for rotation about axis 24.

For illustrative purposes, the body of the roll has a length of about 90 inches, an outer diameter of 5⅛ inches, and an inner diameter of 3⅛ inches. The roll comprises an outer layer 26 of a steel alloy, and an inner layer 28 of a second steel alloy. The outer layer has a radial thickness of about 0.400 inches. Outer layer 26 is formed of an alloy that has low surface energy, high hardness and is relatively insoluble with the material of strip 12, being conveyed. The outer layer forms a support layer for alloy strip 12. Inner layer 28 has a thickness chosen to accommodate the stresses generated by the strip load, the strip motion, the roll geometry and the furnace operating temperature. It is normally several times the thickness of outer layer 26.

Figure 2:
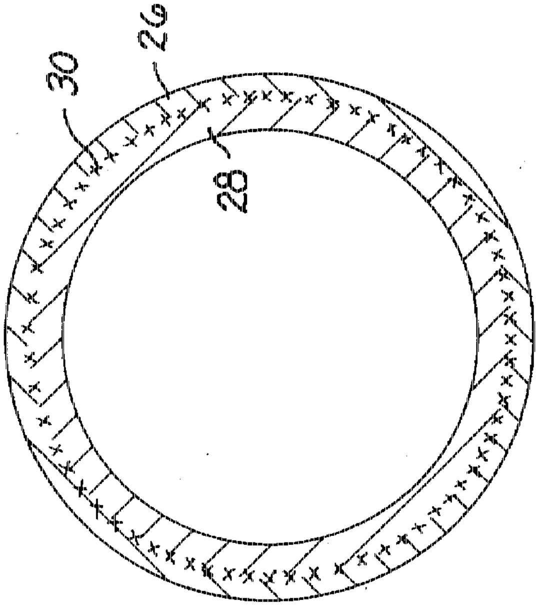
FIG. 2 is an enlarged cross-sectional view of the roll of FIG. 1.

Inner layer 28 is centrifugally cast inside the outer layer while outer layer 26 is still sufficiently hot so that the two alloys fuse along an interface 30 generally illustrated by a series of x's in FIGS. 1 and 2. Outer layer 26 may be a Nicrom 8 steel alloy, available from Alphatech, Inc. of Trenton, Mich.. This alloy is very hard, relatively insoluble and exhibits low or no adhesion with respect to the strip 12 material. The inner layer material may be a Nicrom 72 steel alloy, also available from Alphatech, Inc. Inner layer 28 may be readily welded, for example, to bell shaped sections 16 and 18 after the roll has cooled from the casting process and properly machined.

The roll may be longitudinally divided into rings that can be attached to the outside of a roll body, or the outer layer can be machined to create the rings on the roll of the width and quantity required.

Figure 3:
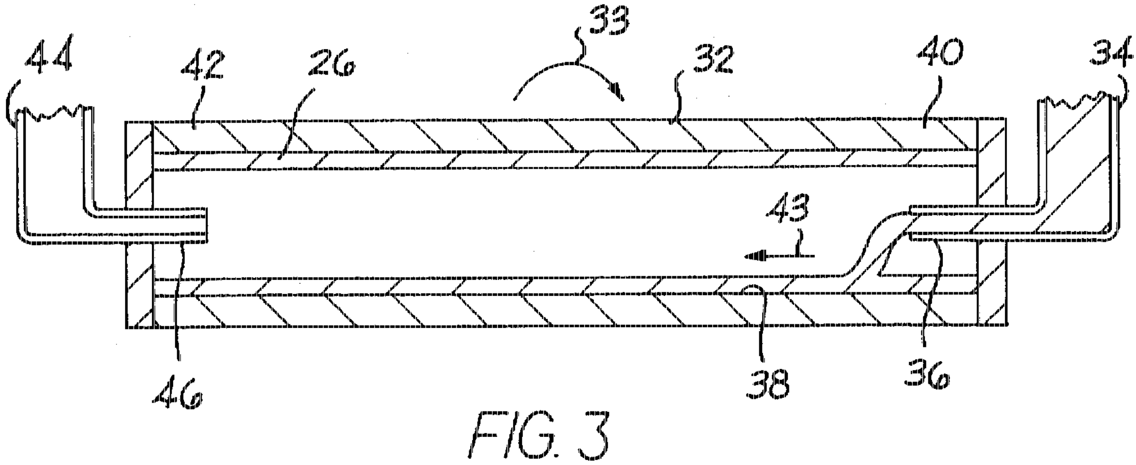
FIG. 3 illustrates the preferred method employed for casting the outer layer of the roll.
Figure 4:
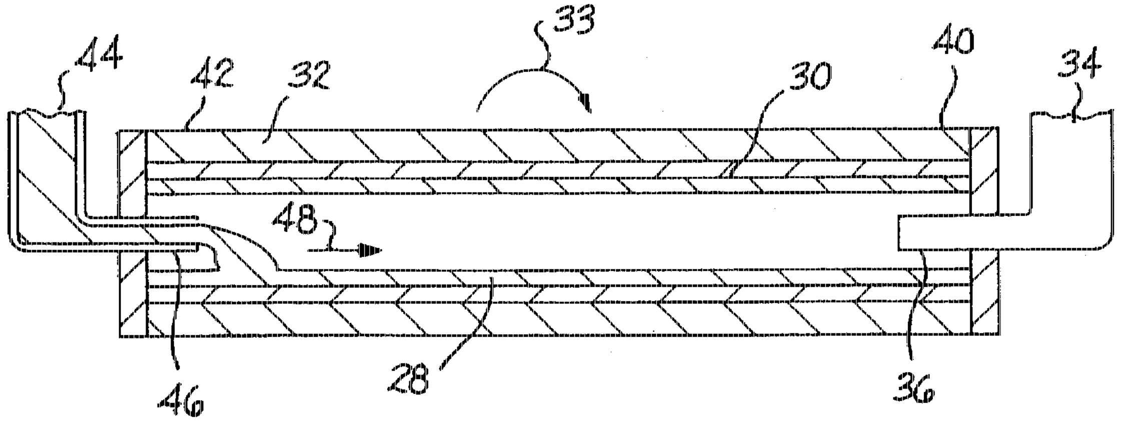
FIG. 4 shows the next step in forming the inner layer of the roll of FIG. 3.

A centrifugal casting apparatus illustrated in FIGS. 3 and 4 comprises an elongated tubular mold 32 which is rotated about its longitudinal axis in the direction of arrow 33. The mold is longitudinally fixed by means not shown. Initially a source 34, such as a ladle, of the outer layer or first alloy is introduced in molten form through a feed nozzle 36 at one end of mold 32 as the mold is being rotated. The molten alloy may be about 2800° F., depending on the final alloy composition. The mold is rotated at approximately 1000 rpm. The first alloy is introduced into the mold and contacts the rotating inside surface 38 of the mold. The alloy then spirals from mold end 40 toward mold end 42, in the direction of arrow 43, forming an outer layer 26 having a relatively uniform thickness. The process is continued until the first alloy has spiraled the length of the mold to form an outer tubular layer.

As soon as the outer layer has been formed to a suitable thickness, delivery of the first alloy from source 34 is terminated. A second alloy, as illustrated in FIG. 4, is introduced from a second ladle or source 44 through a second feed nozzle 46 into end 42 of the tubular mold. The second alloy is introduced inside the rotating outer layer where the interflow of the two molten alloys fuse together in a solution of the two alloys. The fusion progresses in the direction of arrow 48 toward end 40 of the mold. The two layers form a fused joint 30 having a thickness of about ¾ to 1 inch, as illustrated in FIG. 2. Increased or decreased thicknesses may be required depending on the final roll dimensions and application.

When the inner layer has been formed along the full length of the mold, the user terminates delivery of the second alloy from source 44. The multi-cast body 14 is removed from mold 32 and permitted to cool. It is then machined and welded to the remainder of the roll assembly.

Figure 5:
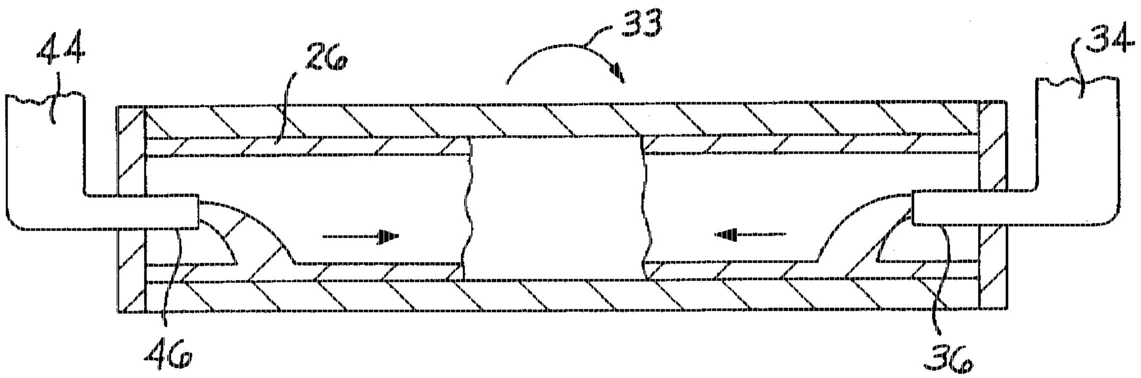
FIG. 5 shows the preferred method used for introducing the first alloy from both ends of the mold.
Figure 6:
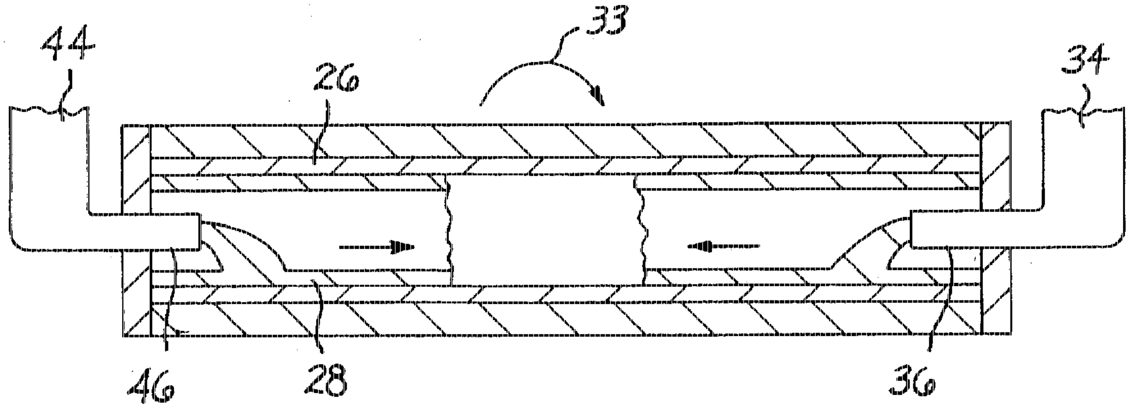
FIG. 6 illustrates the method of FIG. 5 in which the second layer is introduced into both ends of the mold.

FIGS. 5 and 6 illustrate another method for casting multi-cast body 14. In this embodiment of the invention, both sources 34 and 44 initially simultaneously introduce the first alloy in a molten state from both feed nozzles 36 and 46. The first alloy spirals from the two ends of the mold toward one another and the mid-section of the rotating mold. The two alloys contact one another at the mid-section of the mold, thereby forming an outer layer of an adequate thickness.

The second alloy is then introduced simultaneously into both ends of the mold through feed pipe nozzles 36 and 46, as illustrated in FIG. 6, inside the outer layer of the first alloy. Alloys from both ends spiral toward one another to form an inner layer that progressively forms a fused joint between the two layers.

Body 14 has an outer layer formed of a relatively insoluble non-weldable low or non-adhesion material, while the inner layer is formed of a material having good weldability and strength characteristics.

Figure 7:
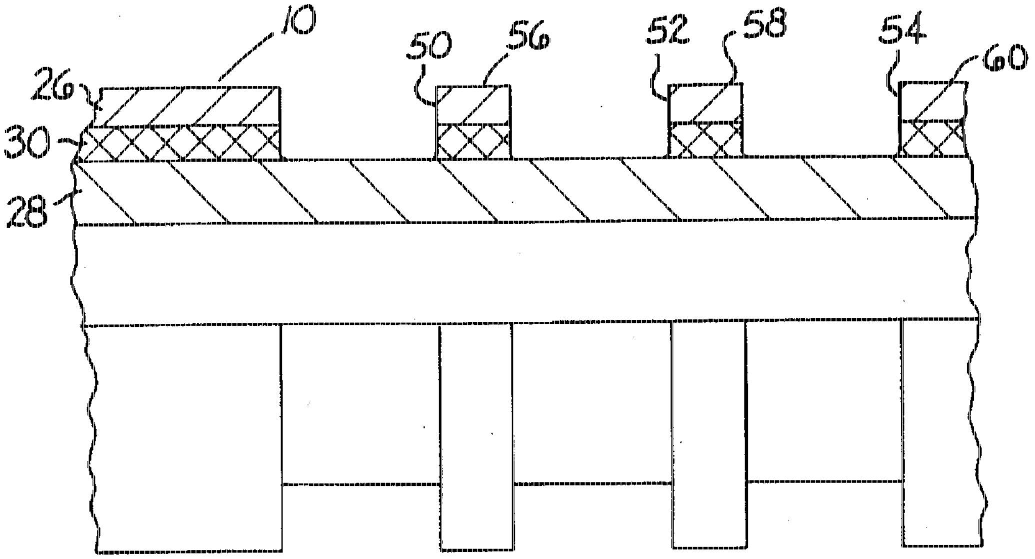
FIG. 7 illustrates a multi-cast roll with axially spaced rings.

FIG. 7 illustrates a multi-cast ringed roll made in accordance with the invention and including an inner layer 28, an outer layer 26, and a fused interface 30 of the two layers. In some conditions, it is preferable to reduce the contact between the roll and the strip being transferred in the furnace. For those situations, roll 10 has annular grooves or recesses 50, 52, and 54. for illustrative purposes, machined into the roll through outer layer 26 and into the fused interface 30 to expose inner layer 28. This machining process will form a series of rings 56, 58 and 60. The axial thickness of the rings is chosen to accommodate the furnace and strip requirements. The machining exposes inner layer 28 which is of a relatively weldable material which may be useful under certain circumstances.

Figure 8:
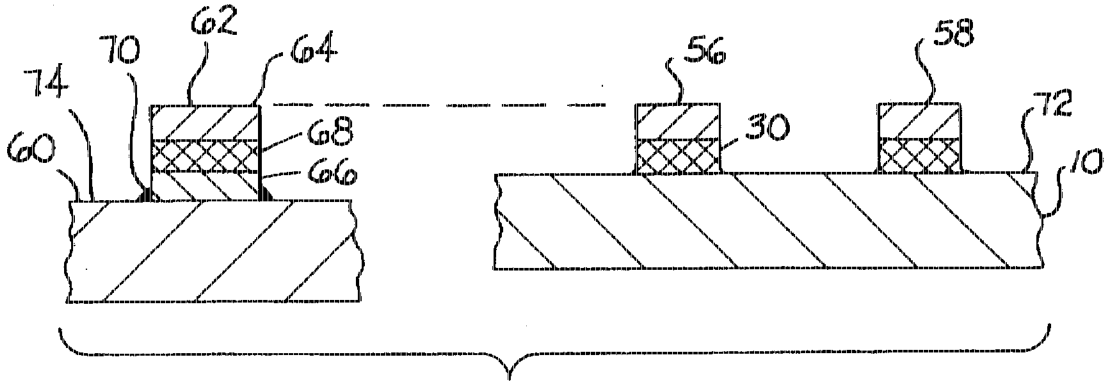
FIG. 8 illustrates the savings in using a roll with unitary rings compared to a roll with welded rings.

One of the greater advantages of such a structure is illustrated in FIG. 8. A portion of the ringed roll is illustrated on the right. A fragment of a roll 60 made in accordance with my prior invention in which a ring 62 having a relatively insoluble or non-weldable outer layer 64 is centrifugally cast with an inner layer 66 to form a fused interface 68. The ring is then welded at 70 to the body of roll 60 as shown on the left side of FIG. 8.

Referring to FIG. 8, the outside diameter of roll 10 at 72 is greater than the outside diameter of roll 60 at 74 since the inner layer 66 of the ring is the same as the diameter 72 of the unitary roll on the right. Consequently the cross-sectional area of roll 10 can be smaller than roll 60. This design and manufacturing approach can be utilized in many applications with the following limitations:

a) the roll body material selection is slightly more limited with the unitary roll;

b) the high thermal conductivity between the rings and the roll body does not make this an optimum design when cold plates are introduced in hot furnaces, since the heat sink effect of the cold plates on the rings may generate "blistering" separation. Blistering separation is a failure common when using solid rolls in furnaces where cold plates are introduced creating a thermal shock on the roll at the point of contact with the plate. Rolls with welded rings eliminate this type of failure because the ring can shrink independently of the roll body without removing any heat from it.

Figure 9:
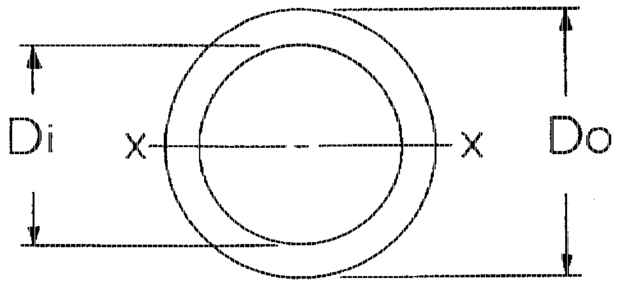
FIG. 9 is a cross-sectional area of a roll.

For illustrative purposes and referring to FIG. 9, the savings using a roll with integral machined rings compared to a roll with welded rings may be determined as follows:

$$W(\text{SectionModulus}) = \frac{I}{C} = \frac{\pi(Do^4 - Di^4)}{32Do}\ (IN^3)$$

C is Distance to Neutral Axis (in.), I is Moment of Inertia (in.$^4$)

with W=CTE (no load change)

$$C = Do/2$$

As Do gets larger the difference ($Do^2$–$Di^2$) decreases and so the cross-sectional area of the roll reduces the amount of material needed to produce it.

For example, assuming:

$$Do_1 = 12 \text{ in } Di_1 = 10 \text{ in } W = \frac{3.14(12^4 - 10^4)}{32 \times 12} = 87.79 \text{ in}^3$$

$$A_1 = \frac{\pi}{4}(12^2 - 10^2) = 34.54 \text{ in}^2$$

If:

$$Do_2 = 13 \text{ in } Di_2 = \sqrt[4]{Do_2^4 - \frac{32Do_2W}{\pi}} = \sqrt[4]{13^4 - \frac{32 \times 13 \times 87.79}{3.14}}$$

Consequently, $$Di_2 = 11.41 \text{ in}$$

and $$A_2 = \frac{\pi}{4}(13^2 - 11.41^2) = 30.46 \text{ in}^2$$

$$\therefore A_2 < A_1$$

For a 120 inch long roll this would represent approximately 147.0 lbs. savings in material weight and ten fold savings in material cost.

If:

$$Do_3 = 24 \text{ in } A^3 = 19.04 \text{ in}^2$$

with nearly 50% savings in material weight.

Having described my invention, I claim:

1. A method for making a roll for transferring a flat, heated strip from a furnace comprising the steps of:
   (a) providing an elongated tubular mold having a first end, a second end, and a longitudinal axis;
   (b) providing a first feed nozzle at said first end of said mold, and a second feed nozzle at said second end of said mold;
   (c) rotating said mold around said longitudinal axis while feeding a first molten alloy through at least one of said feed nozzles such that an outer layer of said first alloy is formed on the inner surface of said tubular mold; and
   (d) rotating said mold around said longitudinal axis while said outer layer is in a molten state, and at the same time feeding a second molten alloy, though at least one of said feed nozzles, such that an inner layer of said second alloy is formed on the inner surface of said still molten outer layer.

2. A method as defined in claim 1, wherein step (c) is performed by feeding said first molten alloy exclusively through said first feed nozzle, and step (d) is performed by feeding said second molten alloy exclusively through said second feed nozzle.

3. A method as defined in claim 1, wherein step (c) is performed by feeding said first molten alloy simultaneously through both of said feed nozzles, and step (d) is performed by feeding said second molten alloy simultaneously through both of said feed nozzles.

4. A method for making a roll for transferring a flat, heated strip from a furnace, comprising the steps of:
   rotating an elongated tubular mold about a longitudinal axis, and introducing a first steel alloy in a molten state inside the rotating mold from a source of the first steel alloy such that the first steel alloy advances in a first axial direction to form an outer layer; and
   then introducing a second steel alloy in a molten state from a source of the second alloy into the outer layer and then axially advancing the second alloy in the opposite axial direction in the rotating mold to form an inner layer, and then
   permitting the two layers to cool to form a rigid multi-cast roll.

5. A method as defined in claim 4, in which the outer layer is formed by introducing the molten first steel alloy into both ends of the rotating mold and then introducing the second steel alloy into both ends of the rotating mold and inside the outer layer of the first steel alloy.

6. A method as defined in claim 4, in which the first steel alloy is simultaneously introduced into both ends of the rotating mold, and then the second steel alloy is simultaneously introduced into both ends of the rotating mold.

7. A method as defined in claim 5, in which the first and second steel alloys are sequentially introduced into opposite ends of the rotating mold.

8. A method for making a roll for transferring a flat, heated strip of a first steel alloy from a furnace, said roll comprising an elongated inner tubular body having a longitudinal axis, the inner body being formed of a second steel alloy, a support layer carried on said inner body having an outer strip-contacting surface for contacting and supporting the flat heated strip as the tubular body is being rotated, said support layer being formed of a third steel alloy that is relatively insoluble with respect to the first steel alloy of the heated strip; said method comprising the steps of:
   rotating an elongated tubular mold about a longitudinal axis, the mold having a first end and a second end;
   introducing the third steel alloy inside the rotating tubular mold from a source of the molten third steel alloy and then advancing the source in the tubular mold in a first axial direction to form said support layer;
   introducing the second steel alloy from a source of the molten second alloy within the support layer as the source of the second steel alloy is being advanced in the opposite axial direction to form an inner body while the support layer is sufficiently heated to form a fused connection therebetween; and
   then permitting the support layer and the inner body to cool to form a rigid unitary multi-cast roll.

9. A method for making a roll for transferring a flat, heated strip from a furnace, comprising the steps of:
   rotating an elongated tubular mold about a longitudinal axis, and introducing a first steel alloy in a molten state inside the rotating mold such that the first steel alloy advances in a first axial direction to form an outer layer; and
   then introducing a second steel alloy in a molten state into the outer layer and then axially advancing the second alloy in the opposite axial direction in the rotating mold to form an inner layer,
   permitting the two layers to cool to form a rigid multi-cast roll; and reducing the outer layer in diameter in selected areas to expose the inner layer.

10. A method for making a roll for transferring a flat, heated strip from a furnace comprising the steps of:

(a) providing an elongated tubular mold having a first end, a second end, and a longitudinal axis;

(b) providing a first feed nozzle at said first end of said mold, and a second feed nozzle at said second end of said mold;

(c) rotating said mold around said longitudinal axis while feeding a first molten alloy through at least one of said feed nozzles such that an outer layer of said first alloy is formed on the inner surface of said tubular mold;

(d) rotating said mold around said longitudinal axis while said outer layer is in a molten state, and at the same time feeding a second molten alloy, though at least one of said feed nozzles, such that an inner layer of said second alloy is formed on the inner surface of said still molten outer layer to form a two layer roll;

(e) removing the two layer roll from the mold; and (f) machining the outer surface of said roll at axially spaced points to form a multiple number of rings comprised of said first alloy.

* * * * *